US009555834B2

United States Patent
Volz et al.

(10) Patent No.: US 9,555,834 B2
(45) Date of Patent: Jan. 31, 2017

(54) MOTOR VEHICLE BODY DESIGNED FOR A COLLISION WITH SMALL OVERLAP

(71) Applicant: Bayerische Motoren Werke Aktiengesellschaft, Munich (DE)

(72) Inventors: Karlheinz Volz, Inning am Ammersee (DE); Hans-Peter Eck, Riemerling (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/715,868

(22) Filed: May 19, 2015

(65) Prior Publication Data

US 2015/0246691 A1    Sep. 3, 2015

Related U.S. Application Data

(63) Continuation of application No. PCT/EP2013/073509, filed on Nov. 11, 2013.

(30) Foreign Application Priority Data

Nov. 20, 2012    (DE) .......................... 10 2012 221 194

(51) Int. Cl.
*B62D 21/15* (2006.01)
*B60R 19/24* (2006.01)
(Continued)

(52) U.S. Cl.
CPC .............. *B62D 21/152* (2013.01); *B60R 19/03* (2013.01); *B60R 19/24* (2013.01); *B62D 25/2081* (2013.01)

(58) Field of Classification Search
CPC .......... B60R 19/24; B60R 19/26; B62D 21/15; B62D 21/152; B62D 25/2081
(Continued)

(56) References Cited

U.S. PATENT DOCUMENTS 3,881,742 A * 5/1975 Felzer ..................... B60R 19/00
280/784
8,322,780 B2 * 12/2012 Nagwanshi .......... B62D 29/005
296/187.03
(Continued)

FOREIGN PATENT DOCUMENTS

DE        43 02 240 A1    8/1993
DE        198 35 705 A1    2/2000
(Continued)

OTHER PUBLICATIONS

English translation of JP 2000-053022; retreived Jun. 7, 2016 from the Japan Platform for Patent INformation located at https://www.j-platpat.inpit.go.jp/web/all/top/BTmTopEnglishPage.*
International Search Report (PCT/ISA/210) dated Jan. 14, 2014 with English translation (six pages).
German Search Report dated May 10, 2013 with partial English translation (10 pages).

*Primary Examiner* — Jason S Daniels
(74) *Attorney, Agent, or Firm* — Crowell & Moring LLP

(57) ABSTRACT

A motor vehicle body includes a longitudinal beam, a bumper cross member, which is fixed to one end of the longitudinal beam, wherein an end section of the bumper cross member protrudes over the longitudinal beam in the transverse direction, and a cantilever beam, which protrudes into a space between a wheel mount and the bumper cross member. The cantilever beam and the end section of the bumper cross member are disposed so as to cooperate with each other such that, during a frontal collision, in particular during a frontal collision with small overlap, the end section of the bumper cross member deformed by the frontal collision impacts an end face of the cantilever beam and can be supported at this end face so that further deformation of the end section of the bumper cross member is prevented.

17 Claims, 3 Drawing Sheets

(51) Int. Cl.
*B60R 19/03* (2006.01)
*B62D 25/20* (2006.01)

(58) Field of Classification Search
USPC .................. 296/187.03, 187.09, 187.1,
193.09,296/203.02, 205; 293/132
See application file for complete search history.

(56) References Cited

U.S. PATENT DOCUMENTS 8,596,711 B2 * 12/2013 Yasui ..................... B60R 19/34
296/187.09

| | | | |
|---|---|---|---|
| 2009/0302591 | A1 | 12/2009 | Auer et al. |
| 2013/0320709 | A1 | 12/2013 | Kuwabara et al. |
| 2013/0328334 | A1 | 12/2013 | Hoiss et al. |

FOREIGN PATENT DOCUMENTS

| | | | |
|---|---|---|---|
| DE | 198 51 495 A1 | | 5/2000 |
| DE | 103 09 629 A1 | | 9/2004 |
| DE | 10 2004 031 086 A1 | | 1/2006 |
| DE | 10 2004 036 332 A1 | | 3/2006 |
| DE | 10 2011 004 105 A1 | | 8/2012 |
| DE | 10 2013 204 313 A1 | | 10/2013 |
| EP | 1 332 949 A2 | | 8/2003 |
| JP | 2000053022 A | * | 2/2000 |
| WO | WO 2007/101285 A2 | | 9/2007 |
| WO | WO 2009/072450 A1 | | 6/2009 |

* cited by examiner

MOTOR VEHICLE BODY DESIGNED FOR A COLLISION WITH SMALL OVERLAP

CROSS REFERENCE TO RELATED APPLICATIONS

This application is a continuation of PCT International Application No. PCT/EP2013/073509, filed Nov. 11, 2013, which claims priority under 35 U.S.C. §119 from German Patent Application No. 10 2012 221 194.2, filed Nov. 20, 2012, the entire disclosures of which are herein expressly incorporated by reference.

This application contains subject matter related to U.S. application Ser. No. 14/715,888, entitled "Motor Vehicle Body Which is Designed for a Collision with Small Overlap" filed on May 19, 2015.

BACKGROUND AND SUMMARY OF THE INVENTION

The present invention relates to a motor vehicle body for a motor vehicle, which is designed or optimized for a collision having a small overlap with a colliding object.

Efforts have recently been made to increase the crash resistance of motor vehicle bodies for the event of a frontal collision having only a small overlap with a colliding object.

A deflector device for a partially overlapping frontal collision for motor vehicles is known from WO 2007/101285 A2, for example, wherein the deflector device is intended to cause the action of a transverse force on the motor vehicle body or on the vehicle during a collision. The deflector device is composed of an articulated beam construction, which in the event of a collision with small overlap with a collision partner, such as another motor vehicle, ensures that a wheel of the motor vehicle is advantageously pivoted in.

It is now the object of the present invention to create a motor vehicle body that is designed for a collision with small overlap, wherein the body is designed with simple measures such that a transverse force or transverse acceleration acts on the motor vehicle body in the event of a collision with small overlap.

This and other objects are achieved by a motor vehicle body according to the present invention having a longitudinal beam, a bumper cross member, which is fixed to one end of the longitudinal beam, wherein an end section of the bumper cross member protrudes over the longitudinal beam in the transverse direction, and a cantilever beam, which protrudes into a space between a wheel mount and the bumper cross member. The cantilever beam and the end section of the bumper cross member are disposed so as to cooperate with each other in such a way that, during a frontal collision, in particular during a frontal collision with small overlap, the end section of the bumper cross member deformed by the frontal collision impacts an end face of the cantilever beam and can be supported at this end face so that further deformation of the end section of the bumper cross member is prevented.

Therefore, the end section of the bumper cross member is only deformed to a certain degree during a frontal collision, which is to say it is bent or buckles in the collision direction. This partial deformation of the end section already causes a certain absorption of the collision energy, and additionally it is possible for the collision partners to laterally slip or slide off each other. In addition, the end section of the bumper cross member cannot be deformed to such a degree that it reaches a yield point and tears off. The longitudinal beam can be a front and/or a rear longitudinal beam. In a corresponding manner, the bumper cross member can be a front longitudinal beam or a rear longitudinal beam. A section of the motor vehicle body in question which comprises the longitudinal beam and the bumper cross member can be part of a front end structure or a tail end structure.

A "cantilever beam" within the meaning of the invention can be a beam that is essentially fixed on one side. The cantilever beam protrudes in particular in the direction of a vehicle outer side.

A "frontal collision with small overlap" within the meaning of the present invention is a frontal collision of the vehicle body with an obstacle. The obstacle can be a fixed, rigid obstacle, or a colliding party, i.e., another motor vehicle. The expression "small overlap" shall mean that the obstacle and the motor vehicle body, or the motor vehicle, do not collide centrally with each other, but collide offset from each other, in particular in such a way that the frontal collision takes place substantially in a region outside the longitudinal beam, which is to say on a side of the longitudinal beam on which a wheel mount is located. A frontal collision with small overlap may denote an overlap of the vehicle body with the obstacle in the transverse vehicle direction of approximately 25% or less.

The wheel mount can be a left or a right wheel mount.

The cantilever beam can be fixed to the longitudinal beam in a torsion-proof manner.

Due to the fixation to the longitudinal beam, the cantilever beam can deflect energy into the longitudinal beam during the collision of the vehicle body with small overlap.

In the motor vehicle body, the end section of the bumper cross member and the end face of the cantilever beam are designed to cooperate with each other during the frontal collision in such a way that a transverse force acts on the motor vehicle body in the event of the collision.

The transverse force causes the collision partners to be pushed away from each other in the lateral direction, which is to say transversely to the collision direction, whereby the collision energy is reduced.

According to one aspect of the motor vehicle body, the cantilever beam extends obliquely forward from the longitudinal beam between a transverse vehicle direction and a longitudinal vehicle direction. The cantilever beam can, in particular, extend obliquely forward in an angular range of 35° to 55° with respect to the longitudinal beam. An angle of approximately 45° is particularly advantageous. The cantilever beam can therefore also be referred to as a diagonal beam.

In these angular ranges, the end-face support of the deformed bumper cross member on the cantilever beam is particularly suited to generate the afore-mentioned transverse forces between the collision partners.

Advantageously, the cantilever beam, the longitudinal beam and the bumper cross member are located substantially in one plane in the motor vehicle body. This plane is preferably located parallel to the longitudinal axis and the transverse axis of the motor vehicle or of the motor vehicle body.

The motor vehicle body preferably has a left longitudinal beam and a right longitudinal beam, to the front ends of which the bumper cross member, which protrudes over the left longitudinal beam and the right longitudinal beam, is fixed. The motor vehicle body accordingly also has a left cantilever beam and a right cantilever beam. The left cantilever beam is supported on the left longitudinal beam, and the right cantilever beam is supported on the right longitudinal beam. However, additionally the left cantilever beam can be supported on the right longitudinal beam via a suitable connection, and the right cantilever beam can be supported on the left longitudinal beam via a suitable connection.

In this way, particularly high strength of the motor vehicle body in the transverse direction is made possible.

According to one aspect of the motor vehicle body, the bumper cross member, the longitudinal beam and/or the cantilever beam can be made of an aluminum material.

The present invention is particularly advantageous especially when the bumper cross member is produced from aluminum due to the weight advantage of aluminum, because aluminum has a lower yield point, and the cantilever beam can prevent the end section of the bumper cross member from tearing off under excessive deformation as soon as the end section impacts the end face of the cantilever beam.

The present invention is overall suitable for bodies allowing for a lightweight construction with lightweight materials and high safety during collisions with small overlap.

A support beam is preferably provided on the motor vehicle body on the other side of the wheel mount, said support beam being designed in such a way that a load of the frontal collision transmitted via a wheel can be absorbed by the support beam. The support beam is, in particular, designed in such a way that it supports a movement of the wheel in the transverse direction during the frontal collision. The other side of the wheel mount in particular refers to the other side of the wheel mount in the driving direction or counter to the driving direction, wherein the cantilever beam is disposed on the one side of the wheel mount. In other words, the bumper cross member, the cantilever beam, the wheel mount having a wheel, and the support beam are disposed behind each other in the longitudinal vehicle direction.

According to the above-described feature, the wheel can be supported on the support beam during a frontal collision, and additionally the special design of the support beam allows the wheel to be pivoted to the outside, so that it cannot penetrate the vehicle body in the direction of a passenger compartment.

The support beam preferably has a chamfered sliding surface for the wheel, which is designed in such a way that the wheel can slide off in an outward direction. The support beam is preferably fixed to the longitudinal beam.

The support beam can also be fixed to another longitudinal beam, such as to a central longitudinal beam, while the cantilever beam is fixed to the front longitudinal beam.

According to one aspect of the motor vehicle body comprising the support beam, the support beam is provided with a car jack receiving element.

According to a preferred embodiment of the motor vehicle body, the end section of the bumper cross member is designed as a closed or open hollow profile element. A profile reinforcement is additionally formed in the hollow profile element.

The profile reinforcement can, in particular, be a reinforcement that is designed in such a way that a deformation, for example a compression, of the hollow profile element of the end section of the bumper cross member is suppressed, or at least limited, in the event of the frontal collision with small overlap.

The profile reinforcement is advantageous in that it increases a strength of the hollow profile element and limits a compressibility of the hollow profile element. If the hollow profile element is less easy to compress, it can also better withstand a bending moment. In this way, premature failure of the bumper cross member can be better prevented, and the cooperation with the cantilever beam can thus be better achieved.

The profile aspect is advantageous in particular in the case of a hollow profile element that is made of a material having a low yield point, because here a tearing of the end section of the bumper cross member can be effectively suppressed during the collision with small overlap. For example, the profile reinforcement has particularly great advantages when the hollow profile element is made entirely or partially of an aluminum material.

According to one aspect of the motor vehicle body having the above-described profile reinforcement, the profile reinforcement is only disposed in the region of the end section of the bumper cross member which strikes the end face of the cantilever beam in the event of a frontal collision with small overlap.

In this region, the profile reinforcement is particularly effective. In addition, providing the profile reinforcement only locally is a particularly weight-saving measure.

Moreover, the profile reinforcement can be designed in such a way that it is not, or essentially is not, deformable as a result of the collision with small overlap.

The expression "not deformable" in this context shall be understood to mean non-deformability under the forces that occur during the frontal collision with small overlap.

The profile reinforcement is preferably made of a foamed or non-foamed plastic material.

As an alternative or in addition, the profile reinforcement can be formed of a metallic extruded profile element, the extrusion direction of which forms a main load direction of the collision with small overlap.

In this way, the profile reinforcement can have a design that is as light as possible and yet offer sufficient strength and non-deformability. For example, a wall thickness of the profile element of the bumper cross member can be selected to be thinner due to the presence of the profile reinforcement, while maintaining strength, so that the bumper cross member is lighter.

The above-described refinements of the present invention can be combined with each other to the extent possible.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
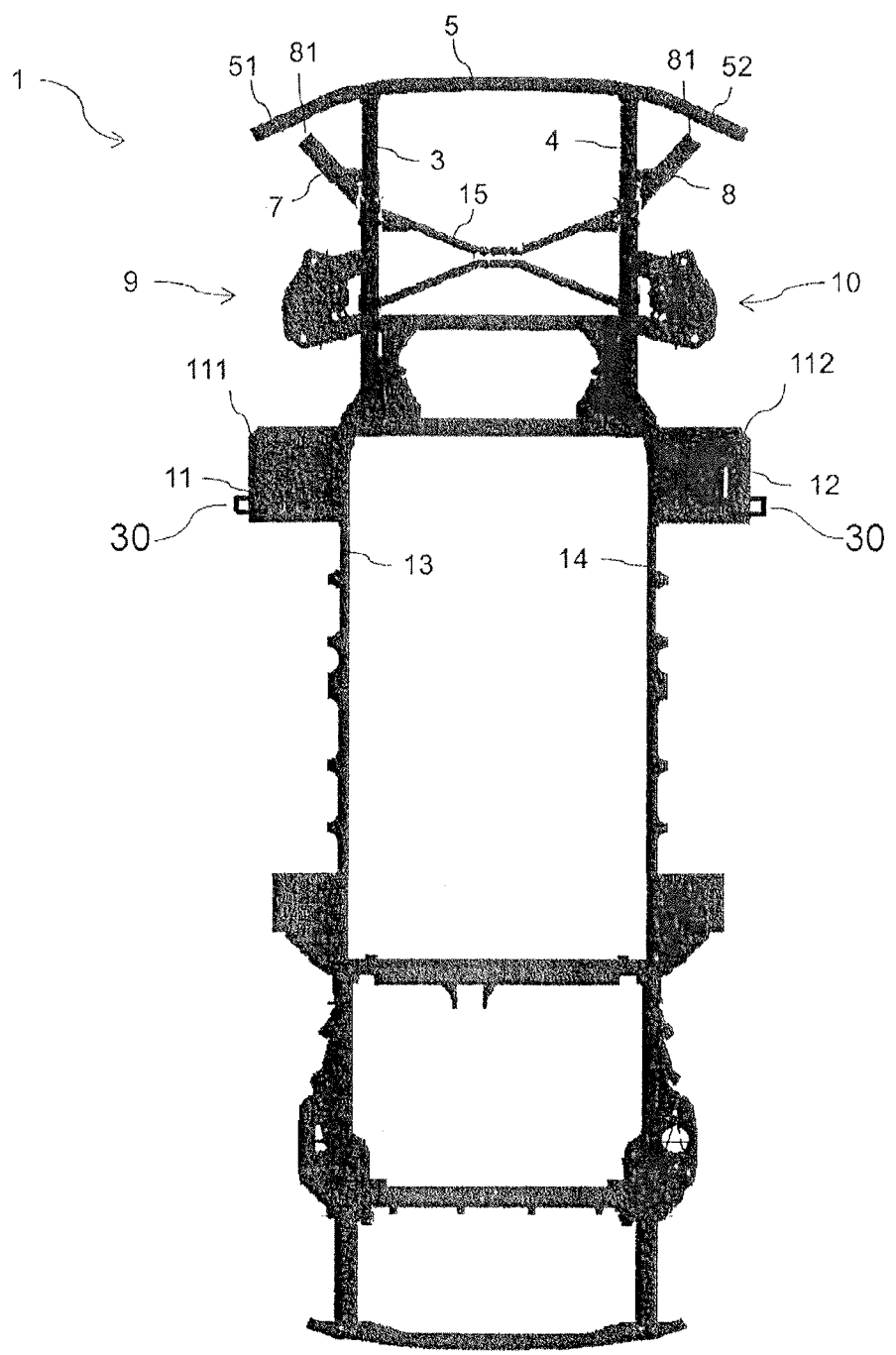
FIG. 1 is a schematic top view onto a lower body frame of a motor vehicle body according to one exemplary embodiment of the present invention.
Figure 2:
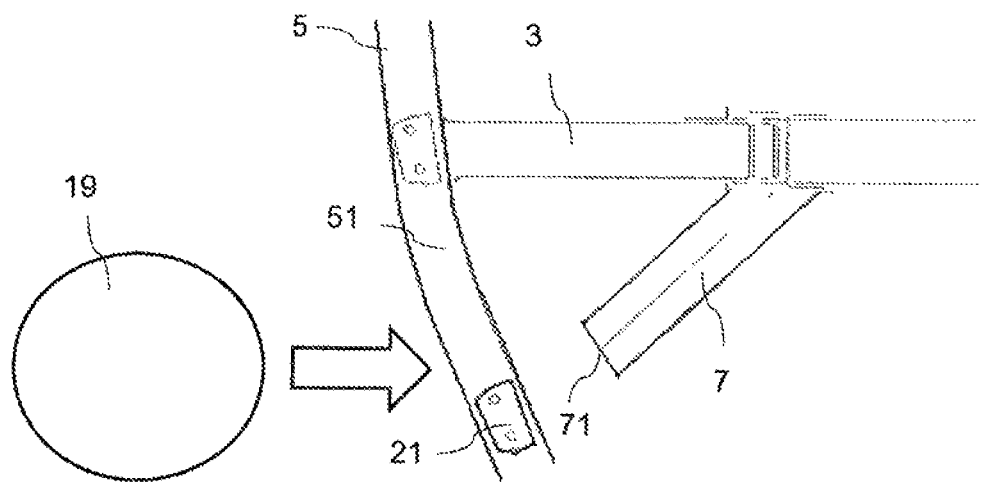
FIG. 2 is a schematic top view onto an end section of a bumper cross member, a longitudinal beam and a cantilever beam of the motor vehicle body according to the exemplary embodiment of the present invention before a frontal collision.
Figure 3:
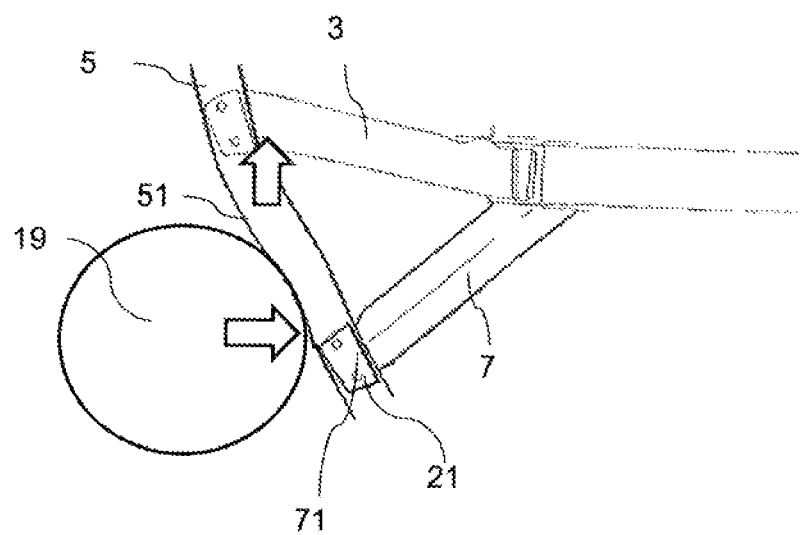
FIG. 3 is a schematic top view onto the end section of a bumper cross member, the longitudinal beam and the cantilever beam of the motor vehicle body according to the exemplary embodiment of the present invention during the frontal collision.

A detailed description of an exemplary embodiment of the present invention is provided hereafter with reference to FIGS. 1 to 3.

FIG. 1 shows a top view onto a lower frame of a motor vehicle body 1. According to the exemplary embodiment, the lower frame of the motor vehicle body 1 is substantially made of aluminum. The motor vehicle body 1 has a front left longitudinal beam 3 and a front right longitudinal beam 4. A bumper cross member 5 is disposed at the ends of the left longitudinal beam 3 and the right longitudinal beam 4. A left end section 51 of the bumper cross member 5 projects beyond the front left longitudinal beam 3, and a right end section 52 of the bumper cross member 5 projects beyond the front right longitudinal beam 4. A cantilever beam 7 is fixed to the front left longitudinal beam 3 in a torsion-proof manner. Likewise, a right cantilever beam 8 is fixed to the front right longitudinal beam 4 in a torsion-proof manner. The left cantilever beam 7 is disposed in a space between a left wheel mount 9 and the left end section 51 of the bumper cross member 5. Likewise, the right cantilever beam 8 is disposed between a right wheel mount 10 and the right end section 52 of the bumper cross member 5. A support beam 11 is located behind the wheel mount 9 in the longitudinal direction, which is to say the wheel mount 9 is disposed between the support beam 11 and the cantilever beam 7. In the event of a frontal collision with small overlap, the support beam 11 is intended to absorb a load of a left wheel, which is not shown. The support beam 11 furthermore has a chamfered sliding surface 111, which is designed and disposed in such a way that it favors sliding of the left wheel off toward an outward direction in the event of a frontal collision with small overlap. Analogously, a support beam 12 having a chamfered sliding surface 112 is formed on the right side of the motor vehicle body 1, the support beam being located behind the wheel mount 10 in the driving direction.

The support beam 11 is fixed to a left central longitudinal beam 13, which is disposed with slight offset in relation to the front left longitudinal beam 3. Likewise, the support beam 12 is disposed on a right central longitudinal beam 14, which is provided with slight offset in relation to the front right longitudinal beam 4.

The support beams 11 and 12 are, moreover, provided in each case with the function of a car jack receiving element 30.

FIG. 1 additionally shows a brace 15 in the manner of a half-timbering design, which is disposed and fixed between the front left longitudinal beam 3 and the front right longitudinal beam 4. The left cantilever beam is additionally supported on the front right longitudinal beam via the brace structure 15. Additionally, the right cantilever beam 8 is also supported on the front left longitudinal beam 3 via the brace 15.

A function of the motor vehicle body during a frontal collision with small overlap will be described hereafter with reference to FIGS. 2 and 3.

FIG. 2 shows a front section of the front left longitudinal beam 3, the cantilever beam 7 fixed thereto in a torsion-proof manner, and the left end section 51 of the bumper cross member 5, wherein the bumper cross member 5 is fixed in a torsion-proof manner to the front end of the longitudinal beam 3. An obstacle 19 is shown schematically as a collision partner in FIG. 2.

During the frontal collision with small overlap, the motor vehicle or the motor vehicle body impacts the obstacle 19 with offset. In particular, the center of the obstacle 19 is located outside the longitudinal beam 3.

As is shown in FIG. 3, the end section 51 of the bumper cross member 5 is bent backward by the obstacle 19 during the collision with small overlap, specifically until the end section 51 of the bumper cross member 5 impacts the end face 71 of the left cantilever beam 7. The strength of the cantilever beam 7 and the support of the cantilever beam 7 on the longitudinal beam 3 is designed in such a way that transverse forces occur, which push or move the collision partners, which in the present example are the motor vehicle and the obstacle 19, away from each other, as is illustrated in particular also by an arrow in FIG. 3. In this way, frontal collision energy can be reduced, insofar as the collision partners are pushed away from each other and the corresponding collision energy no longer has to be absorbed by the motor vehicle body.

As was already described above, a collision partner can be a fixed obstacle or another, oncoming vehicle, which collides with this vehicle or the motor vehicle body with small overlap.

In the further course of the collision, the collision partner impacts the left wheel, which is not shown in FIGS. 2 and 3, and pushes the same against the support element 11, as shown in FIG. 1. During a normal course of the frontal collision with small overlap, the wheel further impacts the chamfered sliding surface 111 of the support beam 11. The chamfered sliding surface causes the wheel to slide off along the chamfered sliding surface 111, and thus in the transverse direction of the motor vehicle body 1. This favors a movement of the wheel in the outward direction.

According to the exemplary embodiment, the cantilever beam and the support beam thus advantageously act in such a way that frontal collision forces are laterally deflected.

Figure 4:
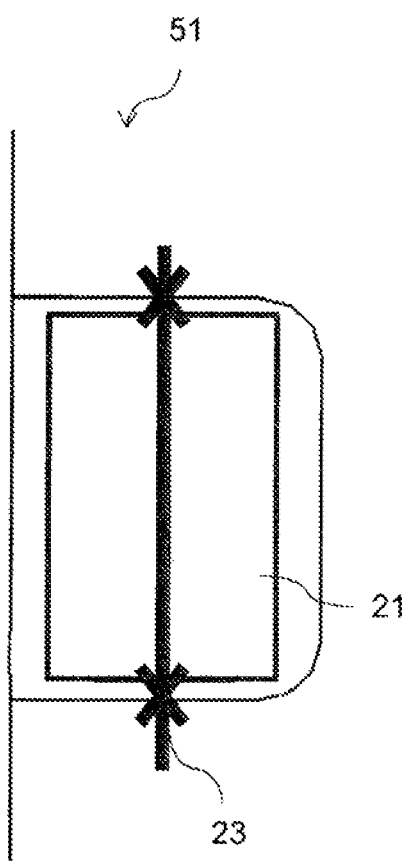
FIG. 4 is a schematic sectional view through the end section of the bumper cross member according to the exemplary embodiment.

FIG. 4 shows a sectional view of the end section 51 of the bumper cross member 5. The end section 51, and preferably the entire bumper cross member 5, is designed as a closed hollow profile element. The closed hollow profile element can be integrally designed or be composed of a U-shaped profile section and a plate element fixed thereto. A profile reinforcement 21 is disposed in a chamber of the hollow profile element. The profile reinforcement 21 substantially takes up the entire hollow profile element cross-section, but alternatively may also take up only parts thereof. The profile reinforcement 21 according to the present exemplary embodiment takes up the portion of the hollow profile element of the end section 51 of the bumper cross member 5 which impacts the end face 71 of the cantilever beam 7 in the event of a collision with small overlap. The profile reinforcement 21 is approximately as wide in the direction of the width of the motor vehicle as the end face 71 of the cantilever beam 7.

The profile reinforcement 21 prevents the end section 51 of the bumper cross member 5, which during the collision impacts the end face 71 of the cantilever beam 7, from being compressed. In this way, bending of the end section 51 of the bumper cross member 5 by the collision partner is also advantageously limited. A yield point of the material of the end section 51 of the bumper cross member is thus not reached until a later point in time, or not at all.

Figure 5:
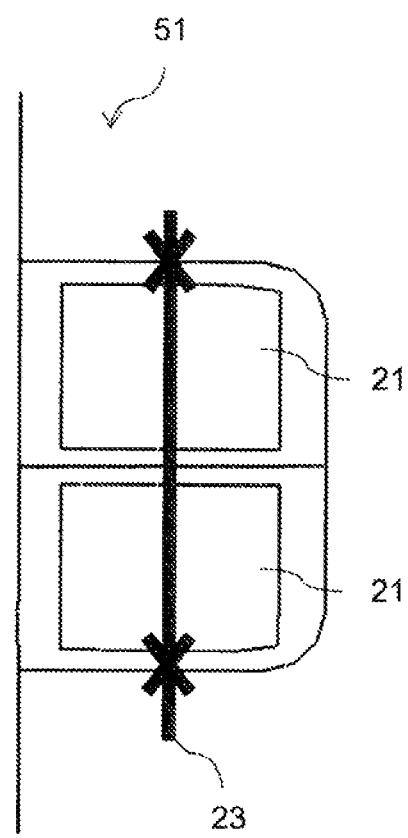
FIG. 5 is a schematic sectional view through the end section of the bumper cross member according to one variant of the exemplary embodiment.

FIG. 5 illustrates an alternative to the hollow profile element shown in FIG. 4. In particular, the alternative hollow profile element is designed with two chambers, while the hollow profile element shown in FIG. 4 comprises only one chamber. A profile reinforcement 21 is disposed in each chamber of the alternative hollow profile element.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle body, comprising:
a longitudinal beam;
a bumper cross member, which is fixed to one end of the longitudinal beam, wherein an end section of the bumper cross member protrudes over the longitudinal beam in a transverse direction; and
a cantilever beam torsionally, rigidly connected to the longitudinal beam, which protrudes into a space between a wheel mount and the bumper cross member, wherein
the cantilever beam extends obliquely forward from the longitudinal beam between a transverse vehicle direction and a longitudinal vehicle direction,
the cantilever beam is provided at an angle of 35° to 55° with respect to the longitudinal beam,
the end section of the bumper cross member is bent toward the cantilever beam,
the cantilever beam and the end section of the bumper cross member are disposed so as to cooperate with each other such that, during a frontal collision with small overlap, the end section of the bumper cross member deformed by the frontal collision impacts an end face of the obliquely extending cantilever beam and is supportable at the end face so that further deformation of the end section of the bumper cross member is prevented, and
the end section of the bumper cross member and the end face of the cantilever beam cooperate during the frontal collision in such a way that frontal collision forces are laterally deflected.

2. The motor vehicle body according to claim 1, wherein the cantilever beam is provided at an angle of approximately 45° with respect to the longitudinal beam.

3. The motor vehicle body according to claim 1, wherein the cantilever beam, the longitudinal beam and the bumper cross member are located substantially in one plane.

4. The motor vehicle body according to claim 3, wherein the one plane is a plane parallel to the longitudinal axis and the transverse axis of the motor vehicle body.

5. The motor vehicle body according to claim 1, further comprising:
a second longitudinal beam; and
a second cantilever beam, wherein
the first and second longitudinal beams form left and right longitudinal beams, respectively, and the first and second cantilever beams form left and right cantilever beams, respectively,
the bumper cross member is fixed to front ends of the left and right longitudinal beams and protrudes over the left and right longitudinal beams, and
the left and right cantilever beams are supported on both the left and right longitudinal beams.

6. The motor vehicle body according to claim 5, wherein one or more of the longitudinal beams, the bumper cross member or the cantilever beams are made of aluminum.

7. The motor vehicle body according to claim 1, wherein one or more of the longitudinal beam, the bumper cross member or the cantilever beam are made of aluminum.

8. The motor vehicle body according to claim 1, further comprising:
a support beam provided on another side of the wheel mount from the cantilever beam, wherein
the support beam is configured such that a load of the frontal collision transmitted via a wheel is absorbable by the support beam and the support beam functions to move the wheel in the transverse direction during the frontal collision.

9. The motor vehicle body according to claim 8, wherein the support beam has a chamfered sliding surface configured to move the wheel in the transverse direction.

10. The motor vehicle body according to claim 8, wherein the support beam is fixed to the longitudinal beam or a second longitudinal beam.

11. The motor vehicle body according to claim 8, further comprising a car jack receiving element provided on the support beam.

12. The motor vehicle body according to claim 1, wherein
the end section of the bumper cross member is configured to have a hollow profile; and
a profile reinforcement is arranged in the hollow profile.

13. The motor vehicle body according to claim 12, wherein the profile reinforcement is disposed only in a region of the end section of the bumper cross member that impacts the end face of the cantilever beam in an event of the frontal collision with small overlap.

14. The motor vehicle body according to claim 13, wherein the profile reinforcement is configured so as not to be deformed by the frontal collision with small overlap.

15. The motor vehicle body according to claim 12, wherein the profile reinforcement is made of a plastic material.

16. The motor vehicle body according to claim 15, wherein the plastic material is a foamed plastic material.

17. The motor vehicle according to claim 12, wherein the profile reinforcement is a metal extruded profile element, an extrusion direction of the profile element forming a main load direction of the frontal collision with small overlap.

* * * * *